United States Patent
Zhang et al.

(10) Patent No.: US 9,741,120 B2
(45) Date of Patent: Aug. 22, 2017

(54) INFRARED IMAGING DETECTION AND POSITIONING METHOD FOR UNDERGROUND BUILDING IN PLANAR LAND SURFACE ENVIRONMENT

(71) Applicant: HUAZHONG UNIVERSITY OF SCIENCE AND TECHNOLOGY, Wuhan, Hubei (CN)

(72) Inventors: Tianxu Zhang, Hubei (CN); Longwei Hao, Hubei (CN); Cen Lu, Hubei (CN); Wenxuan Ma, Hubei (CN); Yuehuan Wang, Hubei (CN); Nong Sang, Hubei (CN); Weidong Yang, Hubei (CN)

(73) Assignee: Huazhong University of Science and Technology, Wuhan, Hubei (CN)

(*) Notice: Subject to any disclaimer, the term of this patent is extended or adjusted under 35 U.S.C. 154(b) by 0 days.

(21) Appl. No.: 15/105,456

(22) PCT Filed: Sep. 2, 2014

(86) PCT No.: PCT/CN2014/085713
§ 371 (c)(1),
(2) Date: Jun. 16, 2016

(87) PCT Pub. No.: WO2015/101058
PCT Pub. Date: Jul. 9, 2015

(65) Prior Publication Data
US 2016/0321795 A1 Nov. 3, 2016

(30) Foreign Application Priority Data

Dec. 31, 2013 (CN) .......................... 2013 1 0754286

(51) Int. Cl.
*G06T 1/00* (2006.01)
*G06T 5/00* (2006.01)
(Continued)

(52) U.S. Cl.
CPC ................ *G06T 7/004* (2013.01); *G01J 5/10* (2013.01); *G06T 5/001* (2013.01); *G06T 7/70* (2017.01);
(Continued)

(58) Field of Classification Search
CPC ............ G01N 2203/0694; G06T 5/001; G06T 2207/10036; G06T 7/004; G06K 9/00637; G03H 2222/16
See application file for complete search history.

(56) References Cited

U.S. PATENT DOCUMENTS

2010/0025582 A1 2/2010 Weil
2013/0322693 A1 12/2013 Del Grande

FOREIGN PATENT DOCUMENTS

CN 101699509 4/2010
CN 102776904 11/2012
(Continued)

OTHER PUBLICATIONS

Anweiler, "Nonlinear Extension of the Heat Equation and Infrared Imagery", 2009, University of Pannonia, pp. 5-12.*
(Continued)

*Primary Examiner* — Kenny Cese
(74) *Attorney, Agent, or Firm* — Hamre, Schumann, Mueller & Larson, P.C.

(57) ABSTRACT

An infrared imaging detection and positioning method for an underground building in a planar land surface environment comprises: obtaining an original infrared image $g_0$ formed after stratum modulation is performed on an underground building, and determining a local infrared image g of a general position of the underground building in the original infrared image $g_0$; setting an iteration termination condition, and setting an initial value $h_0$ of a Gaussian thermal diffusion function; using the local infrared image g as an initial target
(Continued)

image $f_0$, and performing iteration solution of a thermal expansion function $h_n$ and a target image $f_n$ by using a maximum likelihood estimation algorithm according to the initial value $h_0$ of the Gaussian thermal diffusion function; and determining whether the iteration termination condition is met; if the iteration termination condition is met, using the target image $f_n$ obtained by means of iteration solution this time as a final target image f; and if the iteration termination condition is not met, continuing to perform iteration calculation. In the method, by performing demodulation processing on the infrared image formed after stratum modulation is performed on the underground building, the display of the infrared image of the original underground building is clearer, and the real structure of the underground building can be inverted.

4 Claims, 6 Drawing Sheets

(51) Int. Cl.
*G01J 5/10* (2006.01)
*G06T 7/00* (2017.01)
*G06T 7/70* (2017.01)
*G01J 5/00* (2006.01)

(52) U.S. Cl.
CPC ............... *G01J 2005/0077* (2013.01); *G06T 2207/10048* (2013.01); *G06T 2207/20076* (2013.01)

(56) References Cited

FOREIGN PATENT DOCUMENTS

| | | |
|---|---|---|
| CN | 103049889 | 4/2013 |
| CN | 103279935 | 9/2013 |
| CN | 103884431 | 6/2014 |
| JP | 2005283383 | 10/2005 |
| JP | 2009014532 | 1/2009 |

OTHER PUBLICATIONS

Cernuschi, "Thermal diffusivity measurements by photothermal and thermographic techniques", Mar. 2004, vol. 25, Issue 2, pp. 439-457.*

International Search Report for international application No. PCT/CN2014/085713, dated Dec. 3, 2014 (6 pages, including English translation).

J. Li, "Airborne Thermal Infrared Remote Sensing Investigation on Oil Pipes in North China Oil Field," Remote Sensing for Land & Resources, 1991, p. 34-40, including English abstract.

P. Liu et al., "Heat Penetrability Index (HPI) Method for Distilling Subsurface Thermal Information from Satellite Infrared Images," Seismology and Geology, vol. 26, No. 3 (2004), p. 519-527, including English abstract.

J. Xie et al., "Infrared Thermal Image Segmentation Method Using FCM Integrated with Spatial and Frequency Domain," Computer Engineering, vol. 38, No. 15 (2012), p. 201-207, including English abstract.

J. Ling et al., "Infrared Target Extraction Method Based on Kernal Density Estimation," J. Infrared Millim. Waves, vol. 25, No. 6 (2006), p. 434-438, including English abstract.

* cited by examiner

INFRARED IMAGING DETECTION AND POSITIONING METHOD FOR UNDERGROUND BUILDING IN PLANAR LAND SURFACE ENVIRONMENT

TECHNICAL FIELD

The present invention relates to the interdisciplinary field of geophysics theory and remote sensing technology, and in particular, to an infrared imaging detection and positioning method for an underground building in a planar land surface environment.

BACKGROUND ART

At present, with the accelerating urbanization process, more and more people rush into cities, which puts an increasing strain on urban land. Therefore, more buildings have to be built underground, for example, underground parking lots, underground warehouses, and underground restaurants. Of course, many facilities are built underground in view of factor of safety, for example, large-scale underground oil storage and military installations. These are typical examples of underground buildings. Once these underground buildings have a failure, it is difficult to detect a location where the failure occurs. Definitely, difficulty in detection exists not only in urban underground buildings, but also in other aspects such as archaeology, mineral prospection, engineering thermophysics, and dam detection. By this token, underground building detection has great significance in terms of civil use. Therefore, it is necessary to carry out research on detection and identification of underground buildings.

At present, underground building detection studied by scholars worldwide is mainly based on a passive infrared imaging detection technology. The physical basis of this technology is that a lot of solar energy is absorbed by the irradiated soil and produces heat, and the heated soil generate infrared radiation that is detected by an infrared sensor. Natural solar energy, through daily cyclical heating and cooling, produces different effects on a buried object and soils surrounding the buried object, leading to a detectable temperature difference. The existence of an underground building may cause land surface water/heat distribution abnormity, which can be used to detect, discover, verify, and confirm the underground building.

The infrared imaging technology is used by scholars worldwide to detect an underground building. However, the existing infrared imaging sensors studied by the scholars are directly used for imaging, and the obtained infrared image is interpreted manually, which causes great limitation. The limitation lies in that: First, the unusual heat of the underground building is conducted and modulated by the stratum in which the underground building is buried, and when the heat reaches the land surface, the heat distribution changes significantly compared with that for the underground building, which is embodied by a severe thermal diffusion, a significant decrease in a temperature difference, and a weak thermal signal. Secondly, after the conduction and modulation by the stratum, a location of the underground building, which is represented by the land surface thermal signal, may have changed, and it is difficult to find and position the underground building. Thirdly, manual interpretation is difficult, and is unfavorable to accurate detection and positioning of the underground building.

SUMMARY

In view of the foregoing defects or an improvement requirement in the prior art, the present invention provides a novel method for detecting an underground building, in which demodulation processing is performed on an infrared image which includes an underground building, thereby solving the problem that an underground building cannot be manually detected and positioned because a signal of the underground building becomes weak in the infrared image after stratum conduction and modulation; therefore, the present invention can detect and position an underground building in a plane environment.

The present invention provides an infrared imaging detection and positioning method for an underground building in a planar land surface environment, where the method performs, according to a Gaussian model for energy diffusion of an underground building, demodulation processing on an original infrared image formed after stratum modulation is performed on the underground building, to obtain a target image of the underground building; and the method comprises steps of:

(1) acquiring an original infrared image $g_0$ formed after stratum modulation is performed on an underground building heat source, and determining a local infrared image g of a general position of the underground building heat source in the original infrared image $g_0$;

(2) setting an iteration termination condition, and setting an initial value $h_0$ of a Gaussian thermal diffusion function;

(3) using the local infrared image g as an initial target image $f_0$, and performing iteration solution of a thermal expansion function $h_n$ and a target image $f_n$ by using a maximum likelihood estimation algorithm according to the initial value $h_0$ of the Gaussian thermal diffusion function; and (4) determining whether the iteration termination condition is met, if the iteration termination condition is met, using the target image obtained by means of iteration solution this time as a final target image f; and if the iteration termination condition is not met, returning to step (3) to continue to perform iteration calculation.

Preferably, step (1) is specifically:

(1.1) dividing the original infrared image $g_0$ into N infrared image areas having a size of m×m pixels;

(1.2) calculating average gray values of the N infrared image areas, where an average gray value of the $i^{th}$ infrared image area is:

$$G_i = \frac{1}{m \times m} \sum_{j=1}^{m \times m} g_{ij},$$

i=1□N, and $g_{ij}$ is a gray value of the $j^{th}$ pixel in the $i^{th}$ infrared image area;

(1.3) separately calculating a difference between average gray values of adjacent infrared image areas: $\Box G = G_{i+1} - G_i$; and (1.4) using an area having a large average gray value and a small difference $\Box G$ with an average gray value of an adjacent area as the local infrared image g that needs demodulation processing.

Preferably, in the iteration solution of the thermal expansion function $h_n$ and the target image $f_n$ in step (3), iteration calculation is specifically performed according to the following two formulas:

$$h^{n+1}(x, y) = \left\{ \left[ \frac{g(i, j)}{h^n(x, y) * f^n(i, j)} \right] * f^n(-i, -j) \right\} * h^n(x, y)$$

-continued $$f^{n+1}(i,j) = \left\{\left[\frac{g(i,j)}{h^{n+1}(x,y)*f^n(i,j)}\right]*h^{n+1}(-x,-y)\right\}*f^n(i,j)$$

where n is the current number of iterations, (x, y) belongs to a thermal diffusion function support region, (i, j) belongs to an image support region, f(i, j) represents the target image, g(i, j) represents the local infrared image, h(x, y) is the thermal diffusion function, h(−x, −y) represents a conjugate of h(x, y), f(−i, −j) represents a conjugate of f(i, j), and * represents a convolution operator.

Preferably, the iteration termination condition in step (2) is that the number of iteration terminations $n > N_0$ or an error $\epsilon$, and the determining whether the iteration termination condition is met in step (4) is specifically:

determining whether $|g - h^{n+1} * f^{n+1}| < \epsilon$ or $n > N_0$ is met, where if either of the two is met, the iteration termination condition is met; or if neither of the two is met, the iteration termination condition is not met.

In the method of the present invention, demodulation processing is performed on an infrared image formed after stratum modulation is performed on an underground building, display of the original infrared image of the underground building is clearer, and the real structure of the underground building can be inverted. Key physical characteristics of the underground building can be inferred according to infrared information known in the obtained infrared image, achieving an objective of "seeing" and further quantitatively measuring the key physical characteristics of the underground building.

DETAILED DESCRIPTION

Figure 1:
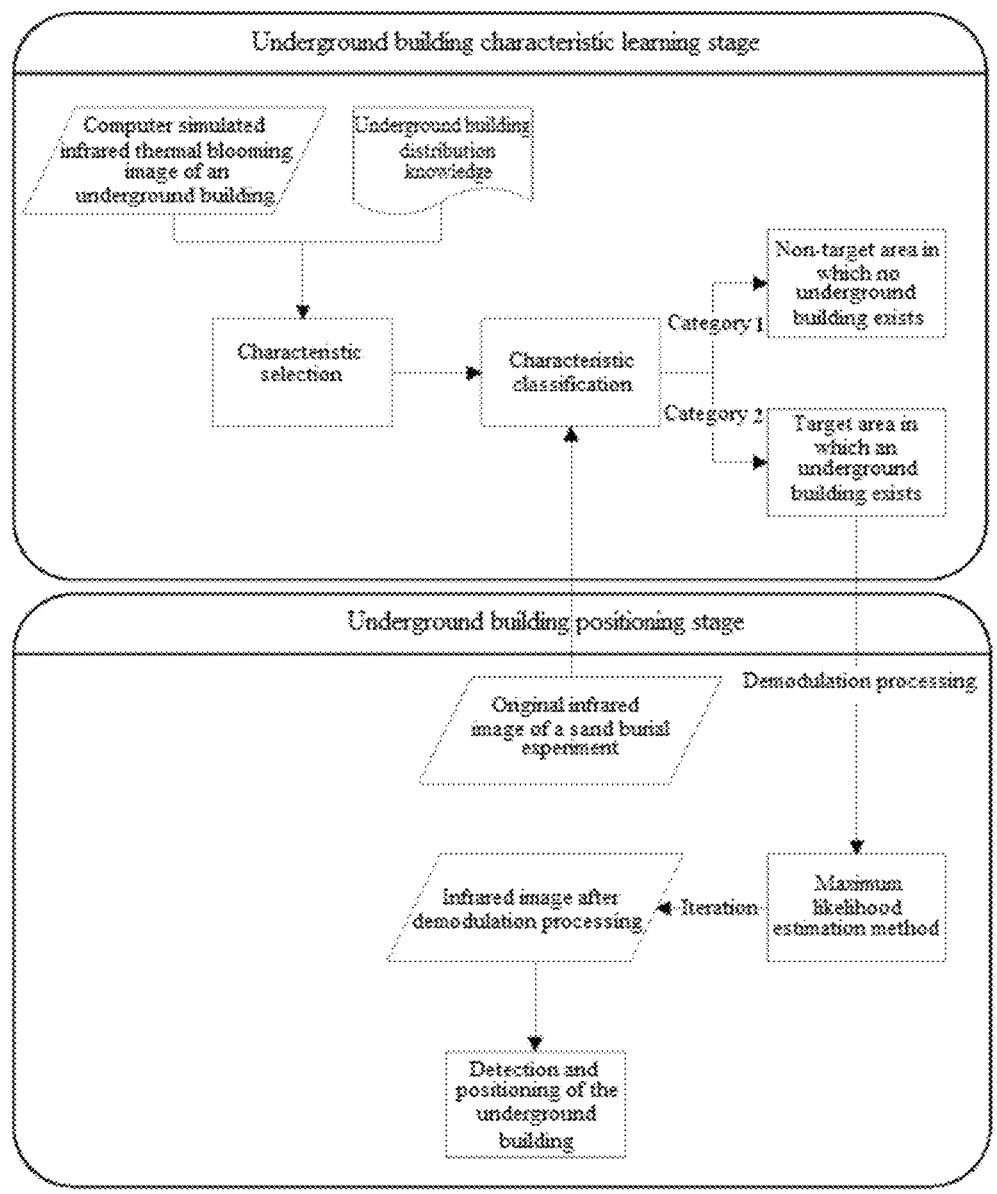
FIG. 1 is a schematic flow chart of the present invention.

For clearer understanding of the objectives, technical solutions and advantages of the present invention, detailed description of the present invention will be given below in conjunction with accompanying drawings and embodiments. It should be noted that the specific embodiments described herein are only meant to explain the present invention, and not to limit the present invention. Furthermore, the technical features involved in the embodiments of the present invention as described below could be combined with each other as long as no conflict is caused.

In the present invention, infrared images in which an underground building in a plane environment exists and infrared images in which no underground building in a plane environment exists are preliminarily classified, and then demodulation processing is performed on an infrared image in which an underground building exists. A detection problem is resolved into an inversion problem in mathematical physics. Structure information and the position of the underground building are detected, to implement detection and positioning of the underground building target. No report the same as the present invention has been found in existing domestic and foreign literatures.

A detection and positioning method for an underground building in a planar land surface environment provided in the present invention includes steps of:

(1) Infrared characteristic analysis and modeling for an underground building in a plane environment: analyze a matter/energy characteristic relationship and lows of interaction between the underground building and a burial environment with the guide of basic theories of subjects such as geophysics, thermology, and remote sensing technology, conduct research and establish an infrared information mapping model between a target area and a background area, and perform classified learning on an infrared simulated thermal image. Step (1) includes the following sub-steps:

(1.1) In the present invention, theoretical analysis on infrared characteristics of an underground building and a relationship between the underground building and the environment is carried out in advance. Modeling and simulation of a typical underground building are carried out by using existing software. To display land surface infrared information of the underground building after stratum modulation, ANSYS is used to perform simulating calculation on heat distribution of an underground building at a depth of 100 m in a planar land surface environment. The thermal radiation simulation of an underground building is implemented according to the thermal radiation analysis in ANSYS 12.0 Thermal Analysis Engineering Application Manual compiled by Zhang Zhaohui.

(1.2) Clustering analysis is performed according to the land surface infrared image simulation result of the underground building, where the obtained infrared image includes target area infrared information and non-target area infrared information, and input infrared images are classified, by using a neighbor geometric constrain means clustering algorithm, into two categories: an infrared image in which an underground building exists and an infrared image in which no underground building exists.

(1.2.1) A sample area in which an underground building exists and a sample area in which no underground building exists are selected from the infrared image, and central positions of the sample areas, that is, the class centers of the sample areas, are determined.

(1.2.2) An average gray value of each sample area is calculated, where an average gray value of the $i^{th}$ infrared image area is:

$$G_i = \frac{1}{m \times m} \sum_{j=1}^{m \times m} g_{ij}$$

(1.2.3) A difference between average gray values of different infrared image target areas is calculated: $\Box G = G_{i+1} - G_i$. A class center distance between non-target areas and a class center distance between target areas are relatively small, a class center distance between a non-target area and a target area is relatively large, and an average gray value of a target area is higher than an average gray value of a non-target area.

(2) Stratum modulation processing procedure of a target area: a general underground building needs to maintain a constant-temperature and constant-humidity state due to various requirements and the state thereof generally remains unchanged. After stratum modulation, the thermal radiation of the underground building will cause the matter and energy migration state in the detected area to change, leading to land surface temperature distribution abnormity and generating a unique infrared information field different from other detected areas. The modulation is manifested as Gaussian thermal diffusion modulation.

We assume that the stratum in the shooting environment is relatively uniform, and land surface infrared images are taken when thermal radiation of the underground building is stable. We conducted experiments to describe time required to present, in a unit having an area of 150 m² at a constant temperature of 25° C., a temperature difference of 0.5 K on an overlying land surface through energy exchange at different depths and with different stratum media. Simulation calculation results are shown in the table below:

| Total | Soil | | Soil + granite with a thickness of 10 m | |
|---|---|---|---|---|
| depth | 50 W/m2 | 100 W/m2 | 50 W/m2 | 100 W/m2 |
| 30 m | 73 days | 49 days | 79 days | 54 days |
| 65 m | 158 days | 107 days | 171 days | 117 days |
| 100 m | 243 days | 164 days | 272 days | 187 days |

It can be learned from the above table that, stratum of different media cannot block target energy exchange. Meanwhile, a standard deviation parameter σ of the Gaussian thermal diffusion function may have the following relationship with a burial depth h of the underground building and a thermal conductivity ϵ of a stratum material:

$$(h/\epsilon) = k\sigma + l$$

(3) Demodulation processing method for a target area infrared image:

In this method, an experiment of detecting and identifying an underground building structure by using a land surface thermal blooming image indicates that after positive stratum modulation transformation and Gaussian thermal diffusion of energy, corresponding inverse transformation is performed, because the taken infrared images are stable infrared images of an underground building after stratum modulation, we can select a stable infrared image with a desirable effect for processing, and a desirable target image can be obtained, which can disclose structure information of the underground building covered by the stratum.

(3.1) Two 10 cm×10 cm heating elements are separately buried into sandy soil rubble with a depth of 10 cm plus a marble slab with a thickness of 1.5 cm, and into sandy soil with a depth of 20 cm plus a marble slab with a thickness of 1.5 cm, where a shooting distance is 4.5 m, the temperature of the shoe dryer heating element is 27° C., the temperature of the burial environment is 22° C., and the surface is covered with a layer of grass. A medium wave infrared camera whose medium wave infrared window is 3.4 to 5 μm is used to take images. By means of calculation according to the thermophysics equation, it can be learned that temperature differences between the land surface corresponding to the target and the environment obtained in this experiment are equivalent to temperature differences between the land surface corresponding to the target and the environment when a 10 m*10 m underground building is buried at a depth of 16 m (2 m of concrete and 14 m of soil) and at a depth of 32 m (2 m of concrete and 30 m of soil).

(3.2) Deconvolution processing on the target area by using a maximum likelihood estimation method:

(3.2.1) An original infrared image $g_0(i, j)$ formed after stratum modulation is performed on an underground building is read, and then a local infrared image of a general position of the underground building in the original infrared image $g_0(i, j)$ is determined. We extract and process the local target infrared image by using a classification method: First, the original infrared image $g_0(i, j)$ is divided into N infrared image areas having a size of m×m pixels, and average gray values of the N infrared image areas are calculated, where an average gray value of the $i^{th}$ infrared image area is:

$$G_i = \frac{1}{m \times m} \sum_{j=1}^{m \times m} g_{ij}, \ i = 1 \Box N,$$

$g_{ij}$ is a gray value of the $j^{th}$ pixel in the $i^{th}$ infrared image area; then a difference between average gray values of adjacent infrared image areas is calculated: $\Box G = G_{i+1} - G_i$. An average gray value difference $\Box G$ between adjacent non-target areas is less than an average gray value difference $\Box G$ between a target area and a non-target area that are adjacent to each other, an average gray value difference $\Box G$ between adjacent target areas is also less than an average gray value difference $\Box G$ between a target area and a non-target area that are adjacent to each other, and an average gray value of a target area is greater than an average gray value of a non-target area. Therefore, an area having a large average gray value and a small difference $\Box G$ with an average gray value of an adjacent area is used as an infrared image $g(i, j)$ that needs demodulation processing.

(3.2.2) An infrared image model formed after stratum modulation is performed on the underground building can generally be expressed as:

$$g(i,j) = \iint h(i,j;\alpha,\beta) f(i-\alpha, j-\beta) d\alpha d\beta + n(i,j) \quad (1)$$

In the formula, $g(i, j)$ is an infrared image at a certain moment, $f(i, j)$ is a target original image, $n(i, j)$ is sensor noise, and $h(i, j; \alpha, \beta)$ is a Gaussian thermal diffusion function.

Generally, it can be assumed that an effect of the stratum modulation on imaging of the underground building is linear shift-invariant, that is, a fuzzy operator (thermal diffusion function) has a space shift-invariant character, which can be described as:

$$h_t(i,j;\alpha,\beta) = h_t(\alpha,\beta)(i,j) \in \Omega \qquad (2)$$

By substituting formula (2) into formula (1), the following convolution form can be obtained:

$$g_t(i,j) = \iint_D h_t(\alpha,\beta)f(i-\alpha,j-\beta)d\alpha d\beta + n(i,j) = h_t(i,j)*f(i,j) + n(i,j) \qquad (3)$$

It can be learned from formula (3) that, in the case that noise is ignored, the structure of the underground building can be recovered from the infrared image formed after stratum modulation only when a thermal diffusion function of Gaussian thermal diffusion is obtained. Demodulation processing is carried out on the infrared image in which an underground building exists obtained after neighbor geometric constraint means clustering. The thermal diffusion function and the target image are estimated by using this image.

(3.2.3) Because the Gaussian thermal diffusion function is unknown, the number of iteration terminations N and an error ε are first set; whether the demodulation processing result is met is checked by using the error ε; and an initial Gaussian thermal diffusion model parameter σ is initialized.

(3.2.4) To simplify symbols, we use one-dimensional description for the image. First of all, the target intensity is defined as a non-negative function: {f(x),x∈X}, where X is a target intensity support region. A thermal diffusion function expressing an effect of the stratum on the target image is defined as: {h(y|x), y∈Y}, where Y is a thermal diffusion function support region. To reduce the error and improve detection accuracy, we can select a land surface infrared image that is taken after the thermal radiation becomes stable, so that the structure of the underground building can be recovered more desirably. The thermal diffusion function can be regarded as a space-invariant function, and we define i(y) as the intensity of the infrared image at the position y in the coordinate system, then $$i(y) = \sum_{x \in X} h(y \mid x) f(x) = \sum_{x \in X} h(y-x) f(x) \qquad (4)$$

Apparently, because h is a space-invariant convolution operator, formula (4) can also be expressed as follows:

$$i(y) = \sum_{x \in X} h(x) f(y-x) \; y \in Y \qquad (5)$$

In most actual cases, i cannot be perfectly detected, and it is always polluted by some noise. Image data actually observed at the pixel position y of the infrared image is g(y). In many cases, the infrared image after stratum modulation has a Poisson distribution property. Therefore, under the condition of a given target intensity f and the thermal diffusion function h, it can be assumed that g(y) is an independent random variant, with i(y;fh) as a mean value, that follows the Poisson distribution. Therefore, a probability of taking an integer gray value g(y) at the pixel position y can be expressed as follows:

$$P(g(y) \mid f, h) = \frac{i^g e^{-i}}{g!} \qquad (6)$$

Assuming that pixels in the observed image are independent from each other, a joint probability distribution of the pixels is expressed as follows:

$$P(g(y_1 y_2 \ldots y_n) \mid f, h) = \prod_{y \in Y} \frac{i^g e^i}{g!} \qquad (7)$$

Take the logarithm of formula (6), to obtain a log-likelihood function thereof, which is expressed as follows:

$$\ln P(g(y_1 y_2 \ldots y_n) \mid f, h) = \qquad (8)$$
$$\sum_y (-i + g \ln i - \ln g!) = \left(-\sum_y i + \sum_y g \ln i\right) - \sum_y \ln g!$$

Assuming that the observed infrared image data $g(y_1 y_2 \ldots y_n)$ is independent of each other statistically, the log-likelihood function of the Poisson joint probability distribution is expressed as follows:

$$\ln P(\{g\} \mid f, \{h\}) = \sum \sum_y (-i + g \ln i - \ln g!) = \qquad (9)$$
$$-\sum \sum_y i + \sum \sum_y g \ln i - \sum \sum_y \ln g!$$

It can be seen that the last item in formula (8) is a constant, which does not affect the change of the likelihood function. To simplify the question, the constant may be discarded. According to formula (4) and formula (8), we can obtain a log-likelihood function, which is expressed as follows:

$$L(f, \{h\}) = \ln P(\{g\} \mid f, \{h\}) = \qquad (10)$$
$$-\sum \sum_{y \in Y} \sum_{x \in X} h(y-x)f(x) + \sum \sum_{y \in Y} \left(g \ln \sum_{x \in X} h(y-x)f(x)\right)$$

What we are interested in is to estimate the target intensity f from the infrared image data $g_1(y_1 y_2 \ldots y_n)$. When the thermal diffusion function h(y|x) is known, we can estimate the target intensity by using some common image deblurring technologies. However, a thermal diffusion function of an underground building is generally unknown, which increases the difficulty of deblurring.

To maximize the log-likelihood function, derivatives of the components f(x) and h(x) in formula (9) may be taken respectively, and the derivatives are set as 0. In this way, it can be derived that:

$$\frac{\partial L(f, \{h\})}{\partial f(x)} = -\sum \sum_{y \in Y} h(y-x) + \sum \sum_{y \in Y} g \frac{h(y-x)}{\sum_{z \in X} h(y-z)f(z)} = 0 \qquad (11)$$

A sum of discrete values of the Gaussian thermal diffusion function is 1, and therefore:

$$\sum_{y \in Y} \sum g \frac{h(y-x)}{\sum_{z \in X} h(y-z)f(z)} = 1 \qquad (12)$$

Therefore, we can establish the following iteration relation:

$$f^{n+1}(x) = f^n(x) \sum_{y \in Y} \sum g \frac{h^n(y-x)}{\sum_{z \in X} h^n(y-z)f^n(z)} \qquad (13)$$

For the two-dimensional image in the present invention, formula (13) should be:

$$f^{n-1}(i, j) = \left\{ \left[ \frac{g(i, j)}{h^{n-1}(x, y) * f^n(i, j)} \right] * h^{n-1}(-x, -y) \right\} * f^n(i, j)$$

where n is the current number of iterations, (x, y) belongs to the thermal diffusion function support region, (i, j) belongs to the image support region, h(−x,−y) represents a conjugate of h(x, y), and f(−i, −j) represents a conjugate of f(i, j).

To take the derivative of h(x) conveniently, i is expressed by using formula (5) and is substituted into formula (9). In this case, the log-likelihood function can be equivalently expressed as follows:

$$L(f, \{h\}) = \ln P(\{g\} \mid f, \{h\}) = \qquad (14)$$
$$-\sum_{y \in Y} \sum_{x \in X} h(x)f(y-x) + \sum_{y \in Y} \sum \left( g \ln \sum_{x \in X} h(x)f(y-x) \right)$$

By taking the derivative of h(x) and setting it as 0, it can be obtained that:

$$\frac{\partial L(f, \{h\})}{\partial h(x)} = -\sum_{y \in Y} f(y-x) + \sum_{y \in Y} g \frac{f(y-x)}{\sum_{z \in X} h(z)f(y-z)} = 0 \qquad (15)$$

The target image is in the support region of the observed image. Because normalization processing is performed on the target original image, a sum of energy values of the target original image is 1. Therefore, the following relation is established:

$$\sum_{y \in Y} g \frac{f(y-x)}{\sum_{z \in X} h(z)f(y-z)} = 1 \qquad (16)$$

Likewise, after the target image $f^{n+1}(x)$ is estimated by using formula (13), we can establish the following iteration relation for solving the new Gaussian thermal diffusion function $h^{n+1}(x)$ $$h^{n+1}(x) = h^n(x) \sum_{y \in Y} g \frac{f^{n+1}(y-x)}{\sum_{z \in X} h^n(z)f^{n+1}(y-z)} \qquad (17)$$

For the two-dimensional image in the present invention, formula (17) should be:

$$h^{n-1}(x, y) = \left\{ \left[ \frac{g(i, j)}{h^n(x, y) * f^n(i, j)} \right] * f^n(-i, -j) \right\} * h^n(x, y)$$

where n is the current number of iterations, (x, y) belongs to the thermal diffusion function support region, (i, j) belongs to the image support region, h(−x,−y) represents a conjugate of h(x, y), and f(−i, −j) represents a conjugate of f(i, j).

Therefore, we can recover the real infrared image of the underground building by using the maximum likelihood estimation method.

(3.2.5) By repeatedly performing iteration on the infrared image g(x, y) by using the maximum likelihood estimation method, the Gaussian thermal diffusion function h(x, y) and the processed infrared image f(x, y) can be obtained.

(4) Recovering and positioning of the underground building:

After demodulation processing is performed on the infrared image in which the underground building exists, thermal energy after Gaussian thermal diffusion can be collected, and the infrared image after the demodulation processing is the infrared image after energy collection, where the infrared image can reflect the heat distribution status of the underground building. In this way, the structure information of the underground building is recovered as authentic as possible, so that people can accurately position the underground building.

The present invention has the following features: First, the method uses Gaussian thermal diffusion as a form of stratum modulation that the underground building goes through. Second, in this method, it is discovered, through the conducted scale model experiment, that by carrying out demodulation processing on an infrared image that includes the underground building and a surrounding environment thereof, the position of the underground building can be seen clearly, and intrinsic information of the underground building is disclosed, so that the underground building can be detected accurately. Third, in the method, after demodulation processing is performed on the simulation result image, the original infrared image of the underground building is displayed more clearly, and moreover, the originally invisible underground tubular facilities are also shown; meanwhile, the real structure of the underground building can be inverted. Key physical characteristics of the underground building can be inferred according to infrared information known in the obtained infrared image, achieving the purpose of "seeing" and further quantitatively measuring the key physical characteristics of the underground building.

The following specifically describes the method in the present invention by using an embodiment. The flow chart of the present invention is shown in FIG. 1. A specific implementation method includes steps of: infrared characteristic analysis and modeling for an underground building in a plane environment, a stratum modulation processing procedure of a target area, a demodulation processing method for a target area infrared image, and recovering and positioning of the underground building. The following further describes the present invention in combination with the accompanying drawings and the specific embodiment.

(1) Infrared characteristic analysis and modeling for an underground building in a plane environment:

In the present invention, theoretical analysis on infrared characteristics of the underground building and a relationship between the underground building and the environment is carried out in advance. To display land surface infrared information of the underground building after stratum modulation, ANSYS is used to perform simulating calculation on heat distribution of the underground building at a depth of 100 m in a planar land surface environment. The thermal radiation simulation of the underground building is implemented according to the thermal radiation analysis in ANSYS 12.0 Thermal Analysis Engineering Application Manual compiled by Zhang Zhaohui. Specific modeling steps are as follows:

(1.1) Selecting a surface effect unit SURF151, which utilizes a node routing unit on the surface of an entity and directly covers the surface of an entity unit. The SURF151 unit has main real constants (an angular coefficient and a Stefan-Boltzmann constant), material attributes (density and thermal radiation), surface load (convection and heat flux density), and body load (heat generation rate).

(1.2) Setting the material attributes corresponding to the surface effect unit: setting the density as 7800, the specific heat as 465, and the radiance as 1.

(1.3) Setting the real constants of the surface effect unit: the Stefan-Boltzmann constant is $5.67 \times 10^{-8}$, and a shape parameter of the angular coefficient is set as 1.

(1.4) Creating a geometric model and dividing grids, where the Keypoint number is set as a default value, and Global Element Sizes are set as 3, that is, a finite element model can be generated.

(1.5) Loading and performing solution by using Anasys.

Figure 2:
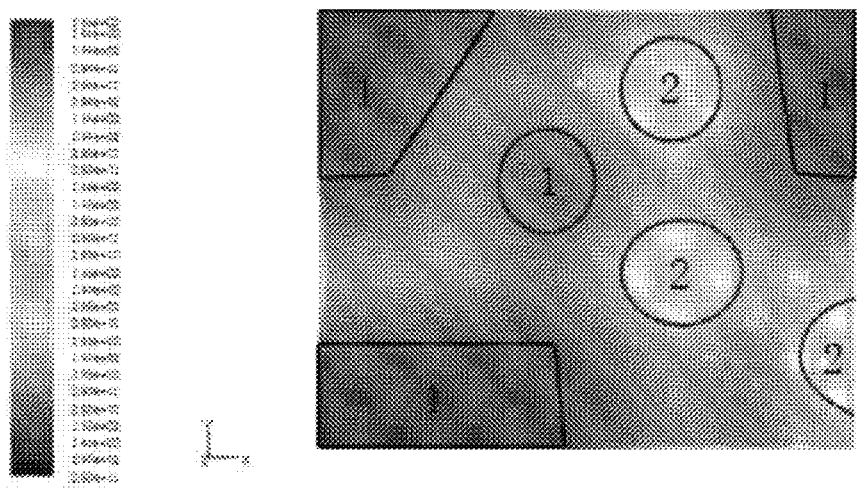
FIG. 2 shows a land surface heat distribution of an underground building (at a depth of 100 m) and a classification result.

(1.6) Checking the solution result, and drawing a simulated image by using Anasys, where the model is shown in FIG. 2.

(1.2) Clustering analysis is performed according to the land surface infrared image simulation result of the underground building, where the obtained infrared image includes target area infrared information and non-target area infrared information, and input infrared images are roughly classified, by using a neighbor geometric constrain means clustering algorithm, into two categories: an infrared image in which an underground building exists and an infrared image in which no underground building exists.

Figure 3:
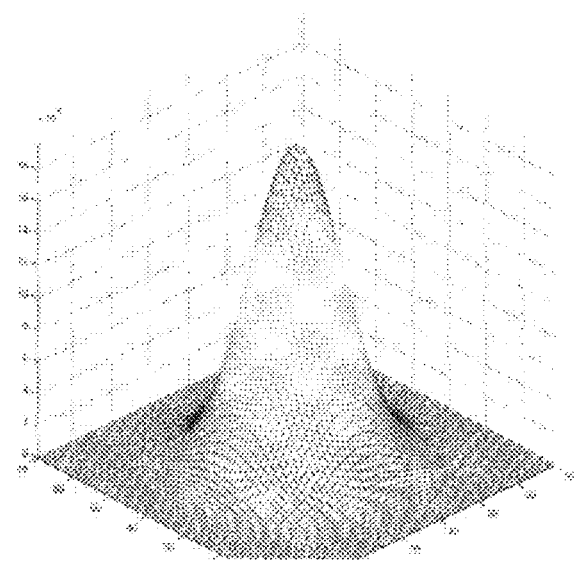
FIG. 3 is a schematic view of a two-dimensional Gaussian function.
Figure 4A:
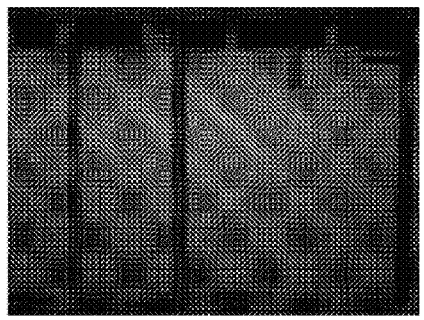
FIG. 4(a) is infrared thermal imaging of a scale model at 19:35.
Figure 4B:
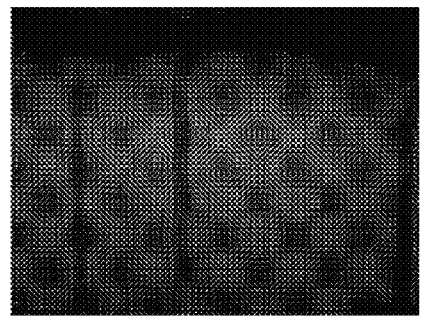
FIG. 4(b) is infrared thermal imaging of a scale model at 20:00.
Figure 4C:
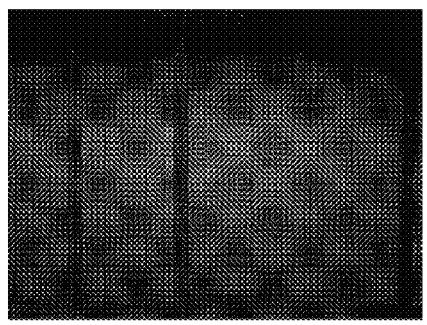
FIG. 4(c) is infrared thermal imaging of a scale model at 20:20.
Figure 4D:
FIG. 4(d) is infrared thermal imaging of a scale model at 20:45.
Figure 4E:
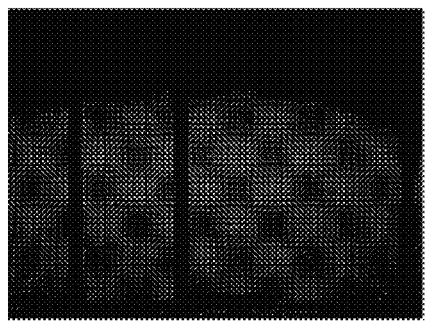
FIG. 4(e) is infrared thermal imaging of a scale model at 21:00.
Figure 4F:
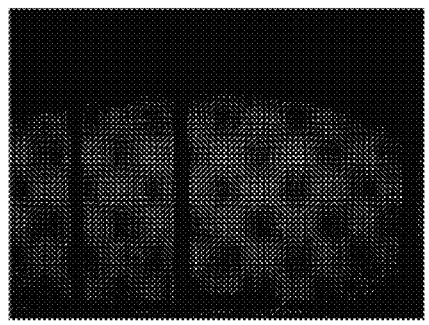
FIG. 4(f) is infrared thermal imaging of a scale model at 21:30.

(1.2.1) A sample area in which an underground building exists and a sample area in which no underground building exists are selected from the infrared image, and central positions of the sample areas, that is, the class centers of the sample areas are determined. In this embodiment, the number 1 represents a non-target area in which no underground building exists, and the number 2 represents a target area in which an underground building exists. A schematic view of areas is shown in FIG. 3.

(1.2.2) An average gray value of each sample area is calculated, where an average gray value of the $i^{th}$ infrared image area is:

$$G_i = \frac{1}{m*m} \sum_{j=1}^{m*m} g_{ij}$$

Because it is a computer simulated result, a temperature value of each point can be directly read, and then an average temperature can be calculated:

$$T_i = \frac{1}{m*m} \sum_{j=1}^{m*m} t_{ij}$$

(1.2.3) A difference between average gray values of different infrared image target areas is calculated: $\Box G = G_{i+1} - G_i$. A class center distance between non-target areas and a class center distance between target areas are relatively small, a class center distance between a non-target area and a target area is relatively large, and an average gray value of a target area is higher than an average gray value of a non-target area. In this embodiment, an average temperature difference between categories in area 2 is 0.1 K, an average temperature difference between categories in area 1 is 0 K, and an average temperature difference between categories of area 1 and area 2 is 0.3 K.

(2) Stratum modulation processing procedure of a target area:

A general underground building needs to maintain a constant-temperature and constant-humidity state due to various requirements and the state thereof generally remains unchanged. After stratum modulation, the thermal radiation of the underground building will cause the matter and energy migration state in the detected area to change, leading to land surface temperature distribution abnormity and generating a unique infrared information field different from other detected areas. The modulation is manifested as Gaussian thermal diffusion modulation. We verify this procedure by conducting an experiment, and the experiment specifically includes the following steps:

(2.1) A 10 cm×10 cm heating element is buried into sandy soil with a depth of 10 cm plus a marble slab with a thickness of 1.5 cm, where a shooting distance is 4.5 m, the temperature of the heating element is 27° C., and the temperature of the burial environment is 22° C. By analyzing the change of infrared imaging experiment data over time, it is found that the gray scale of the background sandy soil area changes slowly, while the gray scale of the sandy soil area corresponding to the target changes significantly as the target temperature diffuses towards the surface. FIG. 4(a), FIG. 4(b), FIG. 4(c), FIG. 4(d), FIG. 4(e), and FIG. 4(f) are infrared images taken at different moments. An original infrared image taken after the thermal radiation is balanced is shown in FIG. 7(a).

Figure 7A:
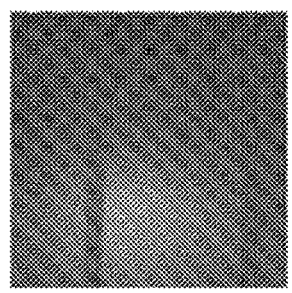
FIG. 7(a) is an original infrared image obtained in sand burial experiment 1.

(2.2) FIG. 7(a) shows a thermal blooming image formed after stratum modulation processing is performed on a heat source, and it is difficult to accurately detect a position of the heat source in the thermal blooming infrared image. According to the shape of the heat source and related knowledge, it can be considered that the modulation takes the form of Gaussian thermal diffusion. Heat conduction of the underground building is spatial heat conduction. Because only information about thermal diffusion from the underground building to the land surface can be detected, the Gaussian thermal diffusion can be equivalent to a two-dimensional Gaussian function model, where the model is shown in FIG. 3.

(3) Demodulation processing method for a target area infrared image:

According to a land surface thermal blooming image formed after stratum Gaussian thermal diffusion modulation is performed on the underground building, a general position of the underground building can be known after step (1). However, the specific structure of the underground building cannot be determined. To obtain specific structure information of the underground building, demodulation processing is carried out, which can disclose the structure information of the underground building covered by the stratum. This is verified by conducting a sand burial scale experiment. A specific implementation process and result are as follows:

(3.1) The sand burial scale experiment we conduct is shooting a simulated real scene. Equipment and a background environment for shooting are shown in the table below:

TABLE 1.1

Equipment used in shooting experiment and related data

| Experiment Equipment | Experimental Parameters |
| --- | --- |
| Long wave infrared camera | Power of the shoe dryer: 10 W |
| Medium wave infrared camera | Voltage: 140 V |
| Transformer | Shoe dryer burial depth: (10 cm/20 cm) |
| Shoe dryer | Dynamic equilibrium temperature of the shoe dryer: 26.8° C. |
| Sand and container | |
| Infrared thermodetector (accuracy: 0.1° C.) | Environment temperature: 22.6° C. |
| | Sampling interval: 30 minutes |
| Film thermodetector (accuracy: 0.01° C.) | Medium wave infrared window: 3.4 to 5 μm |

After carefully designing the experiment, we conduct the experiment multiple times, to establish comparisons and reference, so that data is more accurate and comparable. At the same time, we perform calibration temperature measurement on the image, to obtain the temperature of the entire image scene.

Figure 9A:
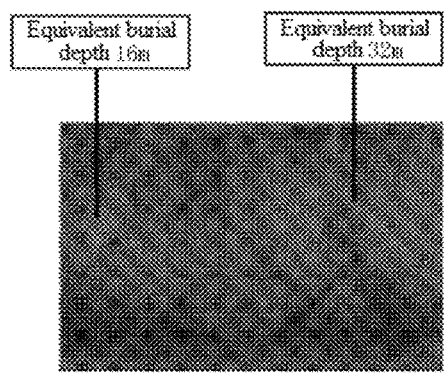
FIG. 9(a) is an original infrared image of sand burial experiment 2.

(3.2) Two 10 cm×10 cm heating elements are separately buried into sandy soil with a depth of 10 cm plus a marble slab with a thickness of 1.5 cm, and into sandy soil with a depth of 20 cm plus a marble slab with a thickness of 1.5 cm, where a shooting distance is 4.5 m, the temperature of the heating element is 27° C., the temperature of the burial environment is 22° C., and the surface is covered with a layer of grass. The original infrared image taken is shown in FIG. 9(a). By means of calculation according to the thermophysics equation, it can be learned that temperature differences, obtained in this experiment, between the land surface corresponding to the target and the environment are equivalent to temperature differences between the land surface corresponding to the target and the environment when a 10 m*10 m underground building is buried at a depth of 16 m (2 m of concrete and 14 m of soil) and at a depth of 32 m (2 m of concrete and 30 m of soil).

(3.3) Deconvolution processing on the target area by using a maximum likelihood estimation method:

(3.3.1) An original infrared image $g_0(i, j)$ formed after stratum modulation is performed on an underground building is read, and then a local infrared image of a general position of the underground building in the original infrared image $g_0(i, j)$ is determined. We extract and process the local target infrared image by using a classification method: First, the original infrared image $g_0(i, j)$ is divided into N infrared image areas having a size of m×m pixels, and average gray values of the N infrared image areas are calculated, where an average gray value of the $i^{th}$ infrared image area is:

$$G_i = \frac{1}{m*m}\sum_{j=1}^{m*m} g_{ij}$$

Then a difference between average gray values of adjacent infrared image areas is calculated: $\Box G = G_{i+1} - G_i$. An average gray value difference $\Box G$ between adjacent non-target areas is less than an average gray value difference $\Box G$ between a target area and a non-target area that are adjacent to each other, an average gray value difference $\Box G$ between adjacent target areas is also less than an average gray value difference $\Box G$ between a target area and a non-target area that are adjacent to each other, and an average gray value of a target area is greater than an average gray value of a non-target area. Therefore, an area having a large average gray value and a small difference $\Box G$ with an average gray value of an adjacent area is used as an infrared image $g(i, j)$ that needs demodulation processing.

(3.3.2) An infrared image model formed after stratum modulation is performed on the underground building can generally be expressed as:

$$g(i,j) = \iint h_t(i,j;\alpha,\beta)f(i-\alpha,j-\beta)d\alpha d\beta + n(i,j) \quad (1)$$

In the formula, g(i, j) is an infrared image at a certain moment, f(i, j) is a target original image, n(i, j) is sensor noise, and h(i, j; α, β) is a Gaussian thermal diffusion function.

Generally, it can be assumed that an effect of the stratum modulation on imaging of the underground building is linear shift-invariant, that is, a fuzzy operator (thermal diffusion function) has a space shift-invariant character, which can be described as:

$$h_t(i,j;\alpha,\beta) = h_t(\alpha,\beta)(i,j) \in \Omega \quad (2)$$

By substituting formula (2) into formula (1), the following convolution form can be obtained:

$$g_t(i,j) = \iint_D h_t(\alpha,\beta)f(i-\alpha,j-\beta)d\alpha d\beta + n(i,j) = h_t(i,j)*f(i,j) + n(i,j) \quad (3)$$

It can be learned from formula (3) that, in the case that noise is ignored, the structure of the underground building can be recovered from the infrared image formed after stratum modulation only when a thermal diffusion function of Gaussian thermal diffusion is obtained. Demodulation processing is carried out on the infrared image in which an underground building exists obtained after neighbor geometric constraint means clustering. The thermal diffusion function and the target image are estimated by using this image. The original infrared image is shown in FIG. 9(a).

(3.3.3) The number of iteration terminations N and an error ϵ are set; whether the demodulation processing result is met is checked by using the error ϵ, and an initial Gaussian thermal diffusion model parameter σ is set. In this embodiment, N=40, ϵ=0.003, and σ=4.0.

(3.3.4) The target intensity is defined as a non-negative function: {f(x), x∈X}, where X is a target intensity support region; and a thermal diffusion function expressing an effect of the stratum on the target image is defined as: {h(y|x), y∈Y}, where Y is a observed image support region. To reduce the error and improve detection accuracy, we can select a surface infrared image that is taken after the thermal radiation becomes stable, so that the structure of the underground building can be recovered more desirably. The thermal diffusion function can be regarded as a space-invariant function, and we define i(y) as the intensity of the infrared image at the position y in the coordinate system, then $$i(y) = \sum_{x \in X} h(y|x)f(x) = \sum_{x \in X} h(y-x)f(x) \quad (4)$$

Apparently, because h is a space-invariant convolution operator, formula (4) can also be expressed as follows:

$$i(y) = \sum_{x \in X} h(x) f(y-x) \quad y \in Y \quad (5)$$

Under the condition of a given target intensity f and the thermal diffusion function h, it can be assumed that g(y) is an independent random variant, with i(y; f, h) as a mean value, that follows the Poisson distribution. Therefore, a probability of taking an integer gray value g(y) at the pixel position y can be expressed as follows:

$$P(g(y) \mid f, h) = \frac{i^g e^i}{g!} \quad (6)$$

Assuming that pixels in the observed image are independent from each other, a joint probability distribution of the pixels is expressed as follows:

$$P(g(y_1 y_2 \ldots y_n) \mid f, h) = \prod_{y \in Y} \frac{i^g e^{-i}}{g!} \quad (7)$$

Take the logarithm of formula (6), to obtain a log-likelihood function thereof, which is expressed as follows:

$$\ln P(g(y_1 y_2 \ldots y_n) \mid f, h) = \quad (8)$$
$$\sum_y (-i + g \ln i - \ln g!) = \left(-\sum_y i + \sum_y g \ln i\right) - \sum_y \ln g!$$

Assuming that the observed infrared image data $g(y_1 y_2 \ldots y_n)$ is independent of each other statistically, the log-likelihood function of the Poisson joint probability distribution is expressed as follows:

$$\ln P(\{g\} \mid f, \{h\}) = \sum \sum_y (-i + g \ln i - \ln g!) = \quad (9)$$
$$-\sum \sum_y i + \sum \sum_y g \ln i - \sum \sum_y \ln g!$$

It can be seen that the last item in formula (8) is a constant, which does not affect the change of the likelihood function. To simplify the question, the constant may be discarded. According to formula (4) and formula (8), we can obtain a log-likelihood function, which is expressed as follows:

$$L(f, \{h\}) = \ln P(\{g\} \mid f, \{h\}) = \quad (10)$$
$$-\sum_{y \in Y} \sum_{x \in X} h(y-x) f(x) + \sum_{y \in Y} \left(g \ln \sum_{x \in X} h(y-x) f(x)\right)$$

What we are interested in is to estimate the target intensity f from the infrared image data $g_1(y_1 y_2 \ldots y_n)$. When the thermal diffusion function h(y|x) is known, we can estimate the target intensity by using some common image deblurring technologies. However, a thermal diffusion function of an underground building is generally unknown, which increases the difficulty of deblurring.

To maximize the log-likelihood function, derivatives of the components f(x) and h(x) in formula (9) may be taken respectively, and the derivatives are set as 0. In this way, it can be derived that:

$$\frac{\partial L(f, \{h\})}{\partial f(x)} = -\sum_{y \in Y} h(y-x) + \sum_{y \in Y} g \frac{h(y-x)}{\sum_{z \in X} h(y-z) f(z)} = 0 \quad (11)$$

A sum of discrete values of the Gaussian thermal diffusion function is 1, and therefore:

$$\sum \sum_{y \in Y} g \frac{h(y-x)}{\sum_{z \in X} h(y-z) f(z)} = 1 \quad (12)$$

Therefore, we can establish the following iteration relation:

$$f^{n+1}(x) = f^n(x) \sum \sum_{y \in Y} g \frac{h^n(y-x)}{\sum_{z \in X} h^n(y-z) f^n(z)} \quad (13)$$

To take the derivative of h(x) conveniently, i is expressed by using formula (5) and is substituted into formula (9). In this case, the log-likelihood function can be equivalently expressed as follows:

$$L(f, \{h\}) = \ln P(\{g\} \mid f, \{h\}) = \quad (14)$$
$$-\sum_{y \in Y} \sum_{x \in X} h(x) f(y-x) + \sum_{y \in Y} \left(g \ln \sum_{x \in X} h(x) f(y-x)\right)$$

By taking the derivative of h(x) and setting it as 0, it can be obtained that:

$$\frac{\partial L(f, \{h\})}{\partial h(x)} = -\sum_{y \in Y} f(y-x) + \sum_{y \in Y} g \frac{f(y-x)}{\sum_{z \in X} h(z) f(y-z)} = 0 \quad (15)$$

The target image is in the support region of the observed image. Because normalization processing is performed on the target original image, a sum of energy values of the target original image is 1. Therefore, the following relation is established:

$$\sum_{y \in Y} g \frac{f(y-x)}{\sum_{z \in X} h(z) f(y-z)} = 1$$

Likewise, after the target image $f^{n+1}(x)$ is estimated by using formula (13), we can establish the following iteration relation for solving the new thermal diffusion function $h^{n+1}(x)$:

$$h^{n+1}(x) = h^n(x) \sum_{y \in Y} g \frac{f^{n+1}(y-x)}{\sum_{z \in X} h^n(z) f^{n+1}(y-z)} \quad (16)$$

In the foregoing embodiment, we use the two-dimensional Gaussian function. The Gaussian function is separable, and two-dimensional function convolution can be replaced by two times of one-dimensional function convolution. Therefore, the demodulation process can be described by using one dimension. For a specific two-dimensional image, it only needs to accordingly transform the formula into a two-dimensional form.

Figure 5:
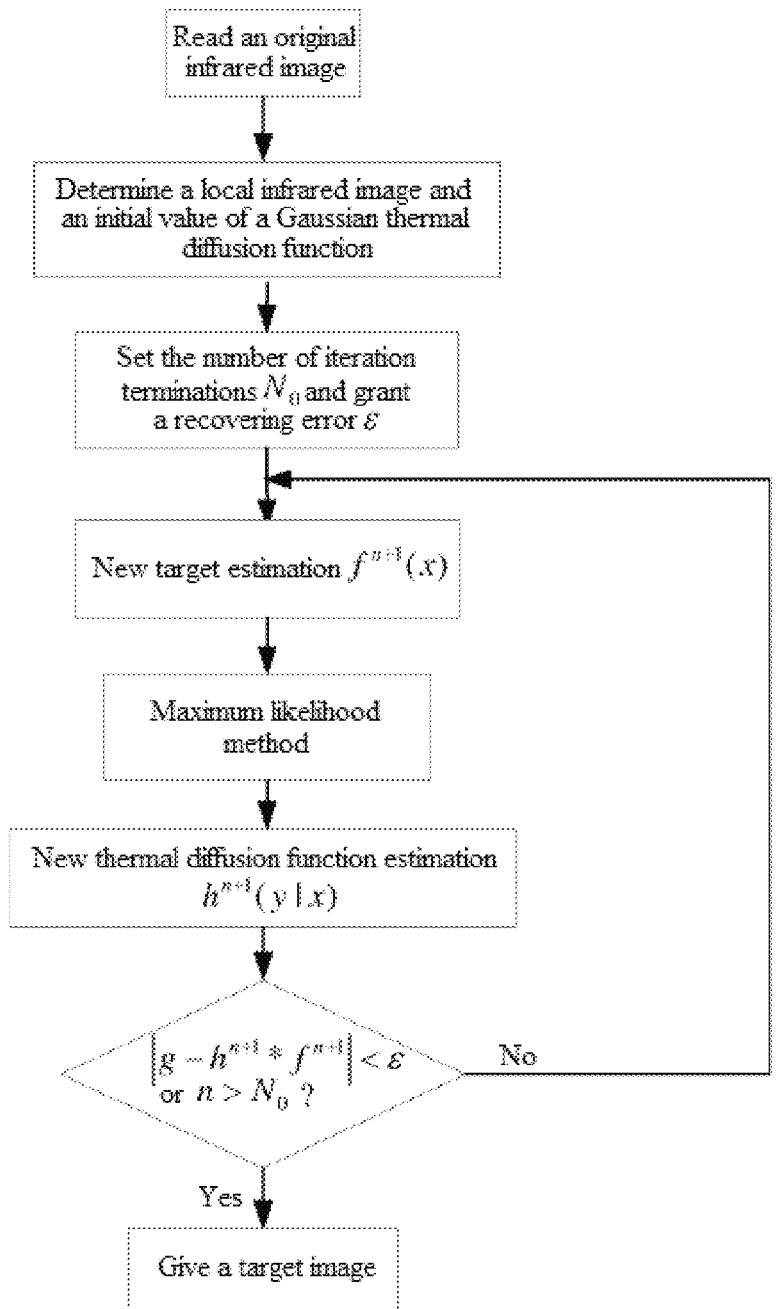
FIG. 5 is a flow chart of recovering an image by means of maximum likelihood estimation.

Therefore, we can find the infrared target image and the Gaussian thermal diffusion function by using the maximum likelihood estimation method. A flow chart of recovering an image by means of maximum likelihood estimation is shown in FIG. 5.

Figure 6:
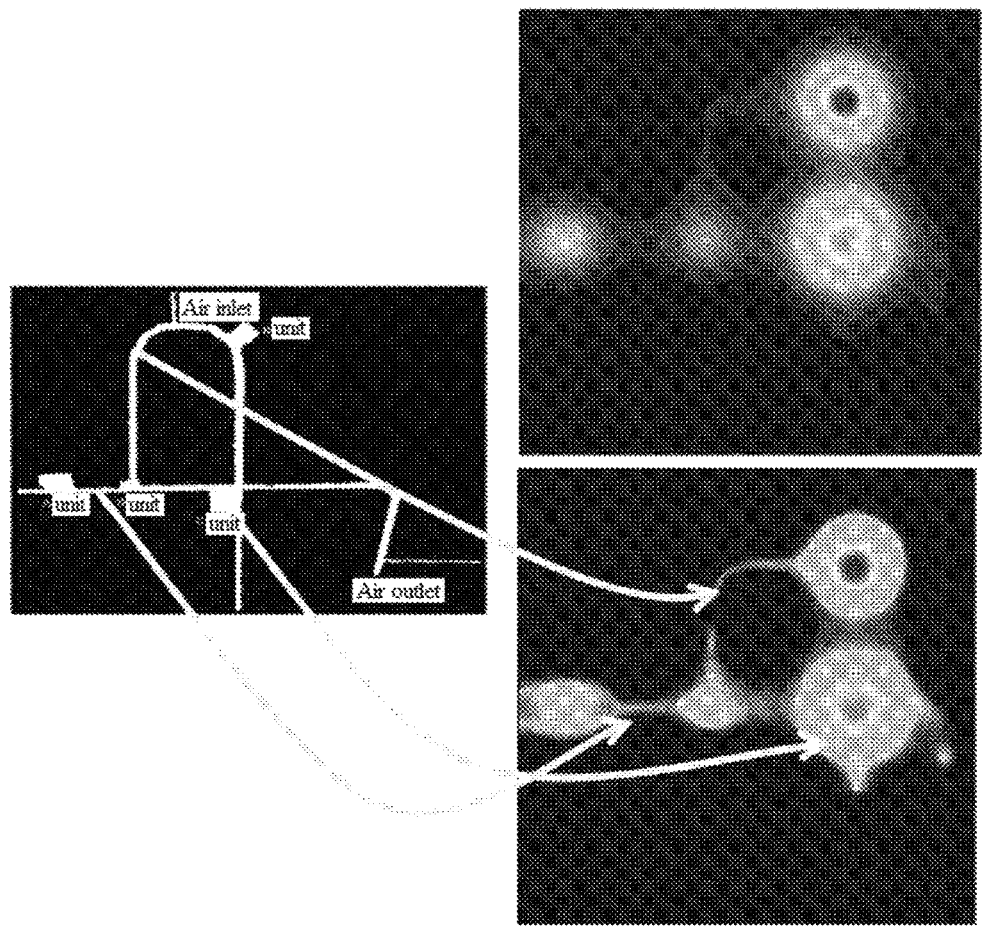
FIG. 6 shows a land surface heat distribution (upper right) and an inversion result (lower right) of an underground building when a typical underground structure is in a plane environment at a depth of 100 m.
Figure 7B:
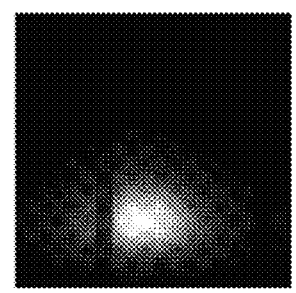
FIG. 7(b) shows a result of sand burial experiment 1 after demodulation processing.
Figure 8A:
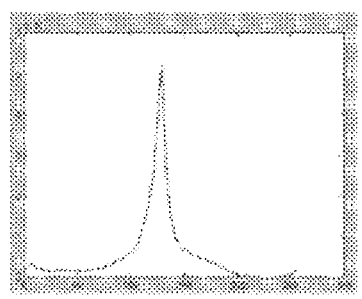
FIG. 8(a) is a thermal diffusion function estimated with an equivalence of a 16-meter underground building, where a standard deviation of the thermal diffusion function is: $\sigma = 6.1$.
Figure 8B:
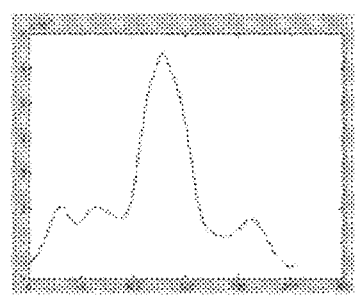
FIG. 8(b) is a thermal diffusion function estimated with an equivalence of a 32-meter underground building, where a standard deviation of the thermal diffusion function is: $\sigma = 9.3$.

(3.3.5) By repeatedly performing iteration on the infrared image g(x, y) by using the maximum likelihood estimation method, the Gaussian thermal diffusion function and the processed infrared target image can be obtained. The specific structure of the underground building can be seen clearly from the processed infrared target image. FIG. 6 is a view showing a comparison of computer simulated images before and after demodulation processing, and meanwhile, the actual underground building and the infrared image after demodulation are labeled. It can be seen from FIG. 6 that in a result image obtained after demodulation processing, a target can be detected and positioned more clearly, which improves the accuracy of manual interpretation. Meanwhile, the structure of a hidden underground building can be inverted. The conducted sand burial experiment is used to verify the present invention. A Gaussian thermal diffusion function of an equivalence of a 16-meter underground building in FIG. 9(a) is shown in FIG. 8(a), and a Gaussian thermal diffusion function of an equivalence of a 32-meter underground building is shown in FIG. 8(b), where a is a standard deviation of the obtained Gaussian thermal diffusion function. FIG. 7(b) is a result image obtained after demodulation processing is performed on FIG. 7(a).

Figure 9B:
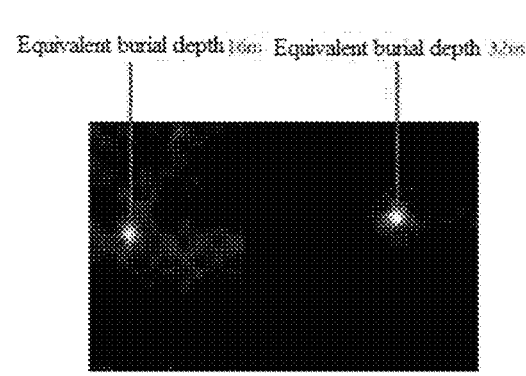
FIG. 9(b) shows a result of sand burial experiment 2 after demodulation processing.

(4) Recovering and positioning of the underground building:

After demodulation processing is performed on the infrared image in which the underground building exists, thermal energy after Gaussian thermal diffusion can be collected, and the infrared image after energy collection can be seen in the infrared image after the demodulation processing, where the infrared image can reflect the heat distribution status of the underground building. In this way, the structure information of the underground building is recovered as authentic as possible, so that people can accurately position the underground building. FIG. 9(b) is a result image obtained after demodulation processing is performed on FIG. 9(a). It can be found by comparing FIG. 9(a) and FIG. 9(b) that the position of a heat source cannot be seen at all in FIG. 9(a), while the position of the heat source can be clearly seen in FIG. 9(b), implementing positioning of the underground building. In addition, it can be seen from FIG. 6 that, the target can be detected and positioned more clearly in the result image obtained after demodulation processing, which improves the accuracy of manual interpretation, and meanwhile, the structure of the hidden underground building can be inverted.

The invention claimed is:

1. An infrared imaging detection and positioning method for an underground building in a planar land surface environment, wherein the method performs, according to a Gaussian model for energy diffusion of an underground building, demodulation processing on an original infrared image formed after stratum modulation is performed on the underground building, to obtain a target image of the underground building; and the method comprises steps of:
   (1) acquiring an original infrared image $g_0$ formed after stratum modulation is performed on an underground building, and determining a local infrared image g of a general position of the underground building in the original infrared image $g_0$;
   (2) setting an iteration termination condition, and setting an initial value $h_0$ of a Gaussian thermal diffusion function;
   (3) using the local infrared image g as an initial target image $f_0$, and performing iteration solution of a thermal expansion function $h_n$ and a target image $f_n$ by using a maximum likelihood estimation algorithm according to the initial value $h_0$ of the Gaussian thermal diffusion function; and
   (4) determining whether the iteration termination condition is met, if the iteration termination condition is met, using the target image $f_n$ obtained by means of iteration solution this time as a final target image f, and if the iteration termination condition is not met, returning to step (3) to continue to perform iteration calculation.

2. The method of claim 1, wherein step (1) is specifically:
   (1.1) dividing the original infrared image $g_0$ into N infrared image areas having a size of m×m pixels;
   (1.2) calculating average gray values of the N infrared image areas, wherein an average gray value of the $i^{th}$ infrared image area is:

$$G_i = \frac{1}{m \times m} \sum_{j=1}^{m \times m} g_{ij},$$

i=1☐N, and $g_{ij}$ is a gray value of the $j^{th}$ pixel in the $i^{th}$ infrared image area;
   (1.3) separately calculating a difference between average gray values of adjacent infrared image areas: ☐G=$G_{i+1}$−$G_i$; and
   (1.4) using an area having a large average gray value and a small difference ☐G with an average gray value of an adjacent area as the local infrared image g that needs demodulation processing.

3. The method of claim 1, wherein in the iteration solution of the thermal expansion function $h_n$ and the target image $f_n$ in step (3), iteration calculation is specifically performed according to the following two formulas:

$$h^{n+1}(x, y) = \left\{ \left[ \frac{g(i, j)}{h^n(x, y) * f^n(i, j)} \right] * f^n(-i, -j) \right\} * h^n(x, y)$$

$$f^{n-1}(i, j) = \left\{ \left[ \frac{g(i, j)}{h^{n-1}(x, y) * f^n(i, j)} \right] * h^{n+1}(-x, -y) \right\} * f^n(i, j)$$

wherein n is the current number of iterations, (x, y) belongs to a thermal diffusion function support region, (i, j) belongs to an image support region, f(i, j) represents the target image, g(i, j) represents the local infrared image, h(x, y) is the thermal diffusion function, h(−x, −y) represents a conjugate of h(x, y), f(−i, −j) represents a conjugate of f(i, j), and * represents a convolution operator.

4. The method of claim 3, wherein the iteration termination condition in step (2) is that n is larger than the number of iteration terminations $N_0$ or $|g-h^{n+1}*f^{n+1}|$ is less than an error $\epsilon$, and the determining whether the iteration termination condition is met in step (4) is specifically:

determining whether $|g-h^{n+1}*f^{n+1}|<\epsilon$ or $n>N_0$ is met, wherein if either of the two is met, the iteration termination condition is met; or if neither of the two is met, the iteration termination condition is not met.

* * * * *